United States Patent [19]

Veltri et al.

[11] Patent Number: 4,600,182
[45] Date of Patent: Jul. 15, 1986

[54] HIGH DENSITY, SINTERED SILICON NITRIDE CONTAINING ARTICLES AND METHODS FOR USING THE SAME TO PROCESS MOLTEN NICKEL

[75] Inventors: Richard D. Veltri, East Hartford; Francis S. Galasso, Manchester, both of Conn.

[73] Assignee: United Technologies Corporation, Hartford, Conn.

[21] Appl. No.: 663,632

[22] Filed: Oct. 22, 1984

[51] Int. Cl.$^4$ .................. C04B 35/58; C21D 1/00; B28B 7/00; B28B 7/34
[52] U.S. Cl. .................. 266/286; 106/38.9; 266/280; 501/97
[58] Field of Search .................. 501/97; 106/38.9; 266/280, 286

[56] References Cited

U.S. PATENT DOCUMENTS 3,969,125  7/1976  Komega et al. .................. 501/97
4,119,475 10/1978  Prochazka et al. .................. 501/97

FOREIGN PATENT DOCUMENTS

WO80/080  1/1980  PCT Int'l Appl. .................. 501/97

OTHER PUBLICATIONS

Greskovich, C., et al; "Basic Research on Technology Development for Sintered Ceramics", Nov. 1976, General Electric Co. Technical Report, AFML-TR-76-179.
Priest, H. et al.; "Sintering of $Si_3N_4$ Under High Nitrogen Pressure", JACS, Jan.-Feb. 1977, p. 81.
Rowcliffe, D. et al.; "Sintering of Silicon Nitride", Stanford Research Institute, Menlo Park, California, pp. 191-196.
Layden et al.; "Development of SiAlON Materials", United Technologies Research Center, Mar. 15, 1978, No. B78-912997-27.
Brennan, J. J.; "Investigate Fiber Reinforced $Si_3N_4$", United Technologies Research Center, Mar. 31, 1976, No. R76-912081-4.

Primary Examiner—Mark L. Bell
Attorney, Agent, or Firm—A. Dean Olson

[57] ABSTRACT

Articles and method for containing molten nickel and methods for making the former. The material used is a high density silicon nitride that is very resistant to the corrosive properties of molten nickel alloys. The composition needed to produce such a containing article comprises polycrystalline silicon nitride containing (by weight) about 0.6% to about 8% alumina, about 15% yttria and about 2% to about 5% silica or amorphous silicon nitride containing about 2% to about 6% alumina, and about 15% yttria and about 2% to about 5% silica. The articles are formed by cold pressing and sintering methods. These articles are particularly useful in processes for molding and (RSR TM) spinning molten nickel alloys.

12 Claims, 2 Drawing Figures

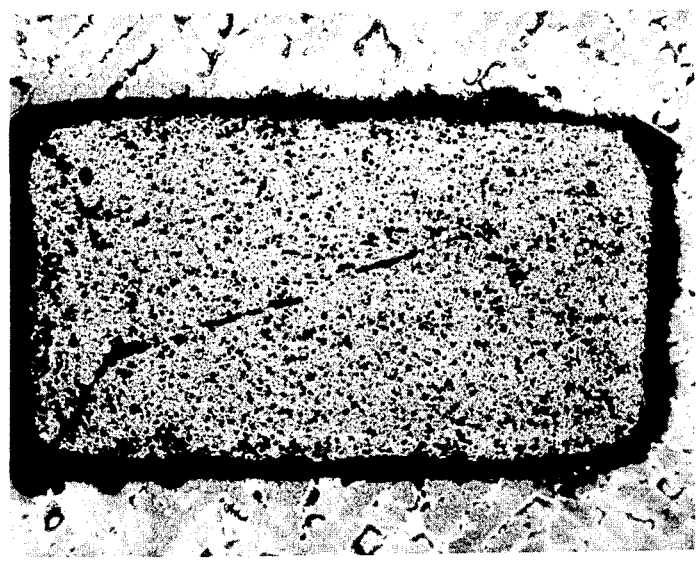
FIG.1  50 X
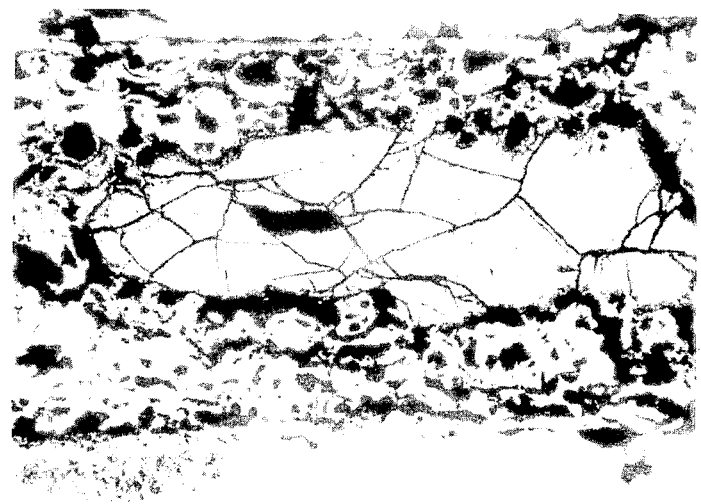
FIG.2  50 X

HIGH DENSITY, SINTERED SILICON NITRIDE CONTAINING ARTICLES AND METHODS FOR USING THE SAME TO PROCESS MOLTEN NICKEL

CROSS-REFERENCE TO RELATED APPLICATONS

Attention is directed to applicants' copending applications Ser. No. 132,368 filed Mar. 21, 1980, now abandoned, Ser. No. 544,815 filed Oct. 25, 1983, now abandoned, Ser. No. 601,205 filed Apr. 17, 1984 and Ser. No. 601,206 filed Apr. 17, 1984, now U.S. Pat. No. 4,550,063 which disclose material similar to that used in the present application, the disclosures of which are incorporated by reference.

TECHNICAL FIELD

The field of art to which this invention pertains is articles of specific chemical compositions, and methods of using such articles, particularly articles for containing molten metals.

BACKGROUND ART

With the increasing demand in the metallurgical area for new nickel based alloys and superalloys the utilization of conventional nickel processing articles has become less acceptable. Current containers for molten nickel alloys typically consist of aluminum oxide or mullite (aluminum oxide and silica). Molds for nickel alloys of these compositions endure few castings before their surfaces have reacted with the molten alloy and are unusable; also, existing nozzles that spin molten nickel are "corroded" by the alloys and thus are short-lived. This adds to manufacturing costs by contaminating the nickel alloys and increasing both production downtime and the quantity of replacement shaping articles. Another problem with present nickel alloy forming articles is that they are not very resistant to thermal shock which occurs when temperatures are raised or lowered quickly as can take place in molding processes. This further decreases the average life-span of nickel alloy processing articles.

Accordingly, there is a constant search in this art for improved articles for processing molten nickel whose compositions are unreactive with nickel alloys.

DISCLOSURE OF INVENTION

This invention is directed at improved articles for containing molten nickel, that are both unreactive with molten nickel alloys and thermally shock resistant, and methods for processing nickel alloys using those articles.

A sintered, high density silicon nitride article for containing molten nickel alloys is described which is nonreactive with molten nickel alloys at 1500° C. and resistant to thermal shock. The tough, thermochemically inert material consists essentially of polycrystalline silicon nitride containing about 0.6% to about 8% alumina, about 15% yttria and about 2% to about 5% silica, all percents by weight. The density of the silicon nitride article for containing molten nickel alloys is typically greater than about 3 gm/cm$^3$.

Another aspect of the invention is a similar containing article utilizing a partially amorphous silicon nitride having about 2% to about 6% alumina, with the same proportion of yttria and silica and having a similar density.

Other aspects of this invention disclosed include improved methods for processing nickel alloys using molten nickel alloy handling and shaping articles. One such application is a method for melting the nickel alloy and molding the resultant molten nickel alloy into a predetermined shape utilizing articles of specific chemical compositions. The articles are composed of a sintered polycrystalline or partially amorphous silicon nitride containing about 15% yttria, about 2% to about 5% silica, and about 0.6% to about 8% alumina in the case of the polycrystalline silicon nitride, and about 2% to about 6% alumina in the case of the partially amorphous silicon nitride.

Another such application is a method of forming nickel alloy particles by rapidly cooling molten nickel alloys using molten nickel alloy handling and shaping articles of specific chemical compositions. A method of pouring molten alloy onto a rapidly spinning disk to form solid particles of nickel alloy is disclosed. The articles are composed of a sintered polycrystalline or partially amorphous silicon nitride containing about 15% yttria, about 2% to about 5% silica, and about 0.6% to about 8% alumina in the case of polycrystalline silicon nitride, and about 2% to about 6% alumina in the case of the partially amorphous silicon nitride.

These discoveries aid the advancement of manufacturing knowledge by disclosing valuable nickel alloy processing technology. These molten nickel forming articles have relatively long production lives and are not easily "corroded" by nickel alloys. In addition they are very resistant to thermal shock. This discovery contributes to the solution of the prior art's problems by describing thermally shock resistant articles that are also highly resistant to attack by molten nickel alloys.

Other features and advantages will be apparent from the specification and claims and from the accompanying drawings which illustrate an embodiment of the invention.

BRIEF DESCRIPTION OF DRAWINGS

FIG. 1 illustrates the resistance to molten nickel of the instant discovery; and FIG. 2 illustrates the degradation of typical Si$_3$N$_4$ articles by molten nickel.

BEST MODE FOR CARRYING OUT THE INVENTION

The silicon nitride useful according to the present invention for attaining the superior properties described is primarily of two types, a polycrystalline Si$_3$N$_4$ and a partially amorphous Si$_3$N$_4$. The particular polycrystalline Si$_3$N$_4$ utilized in the test samples was an AME silicon nitride powder of high purity, −325 mesh, produced by Kowecki Berylco Industries. This material had a particle distribution with less than 2% of the particles having a size greater than 40 microns and 50% of the particles having a particle size less than 0.7 micron. The partially amorphous silicon nitride material used in the test samples was a General Telephone and Electric (GTE) SN 402 silicon nitride. The partially amorphous silicon nitride had about 96% of the material in the alpha phase and the particles were in the 2 to 3 micron size range.

While any Y$_2$O$_3$ can be utilized according to the present invention the preferred yttria was formed by heating Molycorp CP grade yttrium oxalate up to 1000°

C. and cooling back to room temperature over a 24 hour period. And while 15% yttrium oxide was found to give the improved properties desired, small excursions from this percentage are tolerable, e.g. 10 to 16%, with acceptable results.

The $Al_2O_3$ utilized was a Fischer CP grade material. At high nitrogen pressure sintering with polycrystalline silicon nitride as little as 0.6% of this material can be used to produce the desired sintering without adversely affecting other properties such as oxidation resistance and density. Preferably, 3 to 8% $Al_2O_3$ is utilized with a lower nitrogen pressure sintering. When a partially amorphous $Si_3N_4$ powder such as SN 402 (GTE) $Si_3N_4$ is used, about 2% to about 6% of the alumina will result in good high temperature properties but 4% $Al_2O_3$ is preferred.

The articles of the present invention can be made as follows. The silicon nitride, yttria, alumina, and silica are mixed with sufficient methanol to form a paste-like consistency and ball-milled until sufficiently mixed. The powders are then dried in air at room temperature to remove the methanol. Conventional mortar and pestle mixing can also be utilized. For test purposes rod shaped articles were formed. The powders are pressed into the desired shapes and fired until sintered, between about 1700° C. and 2000° C. depending on nitrogen gas overpressure, and preferably at between 1700° C. to 1780° C. at atmosphere pressure for the polycrystalline silicon nitride. The partially amorphous silicon nitride is preferably sintered between 1730° C. to 1800° C. at 1 atmosphere at nitrogen gas overpressure. The temperature should be kept above 1700° C. in order to sinter in about 1 hour but below 1800° C. to prevent decomposition of the silicon nitride. The pressure used to form the articles into the appropriate shape prior to sintering is merely a hand-strength die pressure, (e.g. less than 200 psi), a light pressure simply to form the material into its net shape allowing for an approximately 25% linear shrinkage during sintering. The nitrogen pressure utilized over the cold pressed articles during sintering is of two types, a low nitrogen pressure or a high nitrogen pressure. By low nitrogen pressure is meant a nitrogen pressure of about 0.5 to 2 atmospheres and by high nitrogen pressure is meant at least about 15 atmospheres and preferably 15 to 30 atmospheres. For purposes of a low nitrogen atmosphere, 1 atmosphere nitrogen gas pressure was used and a high nitrogen pressure of 20 atmospheres nitrogen gas pressure was used. While nitrogen is the preferred inert gas useful during sintering, it should be apparent to those skilled in the art that other inert gases such as argon may be utilized.

The sintered article can take any shape so as to form a device useful in handling and shaping molten nickel alloys. Preferred articles include a mold to cast molten nickel and crucibles to melt and transfer the molten nickel. Other preferred articles include metering orifices (nozzles) and disks for (RSR ™ United Technologies) spinning technology. While these sintered silicon nitride containing articles are nonreactive to any molten nickel alloy, they will typically be used to process high nickel alloy strength, high temperature stable alloys such as nickel superalloys. Note, commonly assigned U.S. Pat. Nos. 4,152,488 and 4,209,348, the disclosures of which are incorporated by reference. Although the articles of the present invention are nonreactive, there may be some surface interaction with the molten nickel to an insignificant degree.

It can be appreciated that articles of the present invention can be used with any process that confines molten nickel alloy. Thus in molding, the alloy is confined to a definite shape, and in spinning, the alloy is confined to a continuous stream. Many other shaping processes may be envisioned by one skilled in the art.

Spinning is a process for the rapid cooling and solidification of metal from the liquid state. Typically, molten alloy of metallic material is poured onto a rotating disk. The molten material is atomized by the disk as centrifugal forces shear droplets of the molten alloy from the rim of the disk and fling the droplets outwardly from the disk in a radially extending plane. Curtains of cooling gas are directed downwardly across the droplets causing the droplets to solidify into powder particles of the desired material. Convective cooling concepts are employed to cool the droplets with the rate of metal solidification being dependent upon the heat transfer characteristics between the molten droplets and the cooling gas. Cooling rates on the order of ten to the fifth degrees Centigrade per second ($10^5$° C./sec.) are obtained with state-of-the-art apparatus. Note commonly assigned U.S. Pat. No. 4,355,057, the disclosure of which is incorporated by reference.

In spinning nickel superalloys, nozzles (metering orifices), spinning disks, and other articles that come in contact with molten nickel are generally made from $Al_2O_3$ and $SiO_2$. However, contrary to some of the materials previously used, the materials of this discovery do not react with the molten nickel resulting in no alloy contamination and increased article life.

A variety of nickel alloy molding processes are taught in the literature including commonly assigned U.S. Pat. Nos. 3,260,505; 3,700,023, the disclosure of which is incorporated by reference. These techniques typically use $Al_2O_3$ and $SiO_2$ articles such as molds and crucibles for containing molten nickel. As with RSR processes these materials react with molten nickel. Therefore, any molding process can use the sintered silicon nitride articles of this invention resulting in no alloy contamination and increased article life.

EXAMPLE

A polycrystalline silicon nitride composition containing 15% yttria, 5% alumina and 5% $SiO_2$ was mixed with sufficient methanol to form a paste-like consistency and ball-milled until sufficiently mixed. The powders were then dried in air at room temperature to remove the methanol. For test purposes a rod shaped article was formed. The powders were pressed into a rod 0.125 in. wide by 0.060 in. thick by 1 in. long at 150 psi. The cold pressed rod was then fired for 1 hour at 1750° C. at 1 atmosphere nitrogen over pressure to sinter it. In order to demonstrate the above-described stability in the molten nickel environment the following testing was performed. The sintered rod was inserted in molten nickel alloy comprising a nickel base and 10% Cr, 5% Co, 4% W, 1.5% Ti, 12% Ta and 5% Al for 95 minutes at 2725° F. without any evidence of attack (FIG. 1) (The dark perimeter is believed to be composed of yttria and alumina and is formed during exposure to molten nickel.). In addition, the rod is very resistant to thermal shock which is also a characteristic of silicon nitride based articles, which are even more resilient to thermal shock than the articles mentioned above. In comparison, hot pressed $Si_3N_4$ was severely attacked under the same conditions after 65 minutes. Note FIG. 2.

This discovery significantly advances nickel alloy manufacturing technology. The present invention provides cold pressed sintered silicon nitride containing articles and shaping techniques that solve the problems detailed in the prior art. These processing articles are highly durable when exposed to molten nickel alloys in comparison to the presently used aluminum oxide based materials. Their unreactivity with nickel alloys effectively eliminates contamination of the nickel alloys. In addition their resistance to thermal shock makes them very useful in nickel alloy manufacturing. These two properties increase the life-span of nickel alloy processing articles ultimately resulting in a decrease in production costs, i.e., replacement molds and production downtime. Also the resistance to thermal shock is achieved by cold pressing, eliminating the expense of conventional hot pressing techniques, that being the usual method of forming thermal shock resistant silicon nitride materials.

It should be understood that the invention is not limited to the particular embodiments shown and described herein, but that various changes and modifications may be made without departing from the spirit and scope of this novel concept as defined by the following claims.

We claim:

1. A method of processing nickel alloys in molten nickel alloy handling and shaping articles by melting the nickel alloy and molding the nickel alloy into a predetermined shape wherein the improvement comprises utilizing articles whose chemical composition consists essentially of polycrystalline silicon nitride having
   (1) about 2% to about 5% silica;
   (2) about 15% yttria; and
   (3) about 0.6% to about 8% alumina;
all percents by weight, having a density greater than 3 gm/cm$^3$, being nonreactive with molten nickel alloys at temperatures up to 1500° C. and being resistant to thermal shock.

2. A method of processing nickel alloys as recited in claim 1 wherein the article is a crucible for handling molten nickel.

3. A method of processing nickel alloys as recited in claim 1 wherein the article is a mold for shaping molten nickel.

4. A method of processing nickel alloys in molten nickel alloy handling and shaping articles by melting the nickel alloy and molding the nickel alloy into a predetermined shape wherein the improvement comprises utilizing articles whose chemical composition consists essentially of a partially amorphous silicon nitride having
   (1) about 2% to about 5% silica;
   (2) about 15% yttria; and
   (3) about 2% to about 6% alumina;
all percents by weight, having a density greater than 3 gm/cm$^3$, being nonreactive with molten nickel alloys at temperatures up to 1500° C. and being resistant to thermal shock.

5. A method of processing nickel alloys as recited in claim 4 wherein the article is a crucible for handling molten nickel.

6. A method of processing nickel alloys as recited in claim 4 wherein the article is a mold for shaping molten nickel.

7. A method for processing nickel alloys by making rapidly quenched particles of nickel alloys using molten nickel alloy handling and shaping articles wherein the improvement comprises utilizing articles whose chemical composition consists essentially of polycrystalline silicon nitride having
   (1) about 2% to about 5% silica;
   (2) about 15% yttria; and
   (3) about 0.6% to about 8% alumina;
all percents by weight, having a density greater than 3 gm/cm$^3$, being nonreactive with molten nickel alloys at temperatures up to 1500° C. and being resistant to thermal shock.

8. A method of processing nickel alloys as recited in claim 7 wherein the article is a nozzle for handling molten nickel.

9. A method of processing nickel alloys as recited in claim 7 wherein the article is a disk for shaping molten nickel.

10. A method for processing nickel alloys by making rapidly quenched particles of nickel alloys using molten nickel alloy handling and shaping articles wherein the improvement comprises utilizing articles whose chemical composition consists essentially of a partially amorphous silicon nitride having
    (1) about 0.6% to about 5% silica;
    (2) about 15% yttria; and
    (3) about 16% to about 8% alumina;
all percents by weight, having a density greater than 3 gm/cm$^3$, being nonreactive with molten nickel alloys at temperatures up to 1500° C. and being resistant to thermal shock.

11. A method of processing nickel alloys as recited in claim 10 wherein the article is a nozzle for handling molten nickel.

12. A method of processing nickel alloys as recited in claim 10 wherein the article is a disk for shaping molten nickel.

* * * * *